United States Patent
Poschmann

(10) Patent No.: US 6,503,348 B1
(45) Date of Patent: Jan. 7, 2003

(54) METHOD OF MAKING A METAL MEMBRANE FOIL MADE OF A PALLADIUM ALLOY FOR HYDROGEN SEPARATION

(75) Inventor: Thomas Poschmann, Ulm (DE)

(73) Assignee: Ballard Power Systems AG, Kirchheim/Tech-Nabern (DE)

( * ) Notice: Subject to any disclaimer, the term of this patent is extended or adjusted under 35 U.S.C. 154(b) by 0 days.

(21) Appl. No.: 09/572,872

(22) Filed: May 18, 2000

Related U.S. Application Data

(62) Division of application No. 09/146,142, filed on Sep. 3, 1998, now abandoned.

(30) Foreign Application Priority Data

Sep. 3, 1997 (DE) .......................................... 197 38 513

(51) Int. Cl.[7] .............................. C25D 3/50; C25D 5/50
(52) U.S. Cl. ........................ 148/518; 205/170; 205/224
(58) Field of Search ................................. 148/512, 518; 205/138, 170, 224

(56) References Cited

U.S. PATENT DOCUMENTS

| | | | |
|---|---|---|---|
| 3,428,476 A | 2/1969 | Langley et al. | ............. 96/11 X |
| 4,093,453 A | * 6/1978 | Makino et al. | ............. 148/512 |
| 4,432,839 A | * 2/1984 | Kline | ......................... 205/170 |
| 4,496,373 A | 1/1985 | Behr et al. | .................. 95/56 X |
| 4,589,891 A | 5/1986 | Iniotakis et al. | ............... 96/11 |
| 4,655,797 A | 4/1987 | Iniotakis et al. | ............ 96/11 X |
| 5,139,541 A | 8/1992 | Edlund | ..................... 96/11 X |
| 5,181,941 A | 1/1993 | Najjar et al. | ................. 95/56 X |
| 5,215,729 A | 6/1993 | Buxbaum | ................... 95/56 X |
| 5,259,870 A | 11/1993 | Edlund | ....................... 96/11 X |
| 5,318,688 A | * 6/1994 | Najjar et al. | ................ 205/170 |
| 5,393,325 A | 2/1995 | Edlund | ....................... 96/11 X |
| 5,614,001 A | 3/1997 | Kosaka et al. | ............. 96/11 X |
| 5,738,708 A | 4/1998 | Peachey et al. | ............ 96/11 X |
| 5,782,960 A | 7/1998 | Ogawa et al. | ................. 96/11 |

FOREIGN PATENT DOCUMENTS

| | | | |
|---|---|---|---|
| DE | 452 788 | 11/1927 | |
| GB | 1292025 | 10/1972 | ..................... 95/56 |
| JP | 63-294925 | 12/1988 | ..................... 96/11 |
| JP | 01-004216 | 1/1989 | ..................... 96/11 |
| JP | 1-104792 | 4/1989 | |
| JP | 01-164419 | 6/1989 | ..................... 96/11 |
| JP | 1-222085 | 9/1989 | |

* cited by examiner

Primary Examiner—George Wyszomierski
(74) Attorney, Agent, or Firm—Crowell & Moring LLP

(57) ABSTRACT

Method for manufacturing a metal foil consisting of several metals in which at least one galvanic bath of several different bath types is prepared. Each bath type contains an electrolyte solution suitable for the deposition of one of the metals involved. A layer stack is then formed for the metal foil by successive alternate galvanic deposition of one layer at a time of the metals contained in the various bath types, on the circumference of a rotating deposition roller which is wired as a cathode in the corresponding galvanic bath. This step is followed by a tempering process that converts the layer stack is converted into a homogeneous alloy of the metals. Thereby, a metal membrane foil is produced for hydrogen separation from a process gas of a methanol reformation system in a fuel-cell-operated motor vehicle.

5 Claims, 1 Drawing Sheet

METHOD OF MAKING A METAL MEMBRANE FOIL MADE OF A PALLADIUM ALLOY FOR HYDROGEN SEPARATION

This application is a division of application Ser. No. 09/146,142, filed Sep. 3, 1998 abandoned.

BACKGROUND OF THE INVENTION

This application claims the priority of German application No. 197 38 513.3, filed Sep. 3, 1997, the disclosure of which is expressly incorporated by reference herein.

The present invention relates to the use of a metal membrane foil consisting of a palladium alloy, especially one made of an alloy of palladium and a metal from Group VIII or IB, for separating hydrogen from a mixture of process gases.

Metal membrane foils for hydrogen separation can be used, as is known, for obtaining highly pure hydrogen from a gas mixture of whose components only the hydrogen is able to diffuse through the membrane foil. An important area of application is methanol reformation systems for supplying fuel cell systems in motor vehicles with the necessary hydrogen. The product gas that results from the reformation process, in addition to the desired hydrogen, also contains carbon monoxide, carbon dioxide, and water vapor. Hydrogen separation from this product gas using a membrane foil is a known way of providing hydrogen for the fuel cells, with the entry of carbon monoxide in excessive concentrations into the fuel cells having to be prevented in particular, since this gas acts as a catalyst poison there. For other applications, including in the electronics industry, metal membrane foils for providing highly pure hydrogen, for example with a purity of more than 99.9999% are used.

Metal membrane foils for use in hydrogen separation differ from membrane foils made of other materials such as ceramics, glasses, and polymers by their high selectivity and temperature stability. The metal membrane foils used for hydrogen separation often consist of palladium or palladium alloys. Palladium is characterized by a high hydrogen storage capacity even at room temperature and low hydrogen pressures. However, pure palladium is not suitable for use as a membrane foil, since a β hydride phase is produced in a certain temperature range that can lead to embrittlement and hence to crack formation. Therefore, an alloy partner from Group VIII or IB is usually added to the palladium. In commercially available hydrogen separation units, rolled foils that are typically 50 $\mu$m to 100 $\mu$m thick are made, produced from such a palladium alloy.

The manufacture of very thin foils with thicknesses of less than 50 $\mu$m by rolling is theoretically cumbersome and cost-intensive because of the various rolling and intermediate annealing steps. In addition, the rolled foils with the smallest thicknesses can only be obtained with a maximum width of about 150 mm. Therefore, the electronics industry has resorted in the meanwhile to galvanic production of foils from copper or nickel. In this way, foil thicknesses of 20 $\mu$m or less can be obtained with foil widths of 1.5 m to 2 m. In this conventional galvanic manufacture, the copper or nickel is precipitated from.a galvanic bath onto a stainless steel roller that dips into the galvanic bath and rotates.

It is known from Offenlegungsschrift JP 1-222085 (A) to use multilayer metal foils made of Cu—Fe, Fe—Ni, Cu—Ni, or Cu—Fe—Ni for PC board traces and magnetic shielding and to produce them by conducting a stainless steel strip, following bright annealing, sequentially through electrolyte baths, each of which is suitable for deposition of one layer at a time of the multilayer structure of the resultant metal foil.

DE 452 788 describes a method for galvanic manufacture of metal plates of uniform layer thickness in electrolyte baths with different compositions, in which the deposition of the metal materials takes place on an endless belt which passes continuously through the electrolytic baths and consists, for example, of copper. The belt serves as the mother cathode and is guided by a corresponding system of rollers. It can dip alternately for example into a copper bath and a nickel bath in order to produce copper and nickel layers in any repeated alternate sequence of layers. The metal plates produced in this fashion are used for catalytic reactions and storage batteries.

Offenlegungsschrift JP 1-201429 (A) describes the manufacture of metal foils made of a Be—Cu alloy by plating Be on a foil made of copper or of a copper alloy, with heat treatment being performed in an inert gas or a reducing gas atmosphere after the plating process to produce alloy-forming thermal diffusion. The metal foil thus produced can be used for electrical switches and relays and as a material for electromagnetic shielding.

Offenlegungsschrift JP 1-104792 (A) describes the electrolytic manufacture of a metal foil from an Fe—Ni alloy with a high nickel content, with galvanic deposition taking place on a cathode drum made of Ti, Ta, Nb, or a Ta—Nb alloy with a defined surface roughness and special process parameters in order to achieve the high nickel content.

SUMMARY OF THE INVENTION

An object of the present invention is the advantageous use of a palladium-containing metal membrane foil in hydrogen separation, for example in methanol reformation systems for fuel-cell-operated motor vehicles.

The present invention achieves this object by providing a use with a metal membrane foil manufactured by the steps of preparing at least one galvanic bath of several different bath types, with each bath type containing an electrolyte solution suitable for the deposition of one of the metallic alloy partners, and forming a layer stack for metal membrane foil by successive alternate galvanic deposition of layers consisting of one of the metallic alloy partners contained in the various types of baths, on the circumferences of deposition rollers that dip into galvanic baths of the baths in question, is electrically wired as a cathode, and is set rotating.

The metal membrane foil used in this way is built up from alternate layers of the different alloy partners which are each deposited galvanically. For this purpose, the next layer is applied to the layer structure reached up to that point on the circumference of a deposition roller that is electrically charged as a cathode and caused to rotate.

With this procedure, metal membrane foils can be produced in smaller thicknesses at comparable expense than with a rolling technique, which is especially advantageous for foils that are to be used for permeation purposes, such as the present case of hydrogen separation. Halving the foil thickness results in a doubling of the permeation rate, so that the material requirements for a given required permeation rate are smaller by a factor of four.

Membrane foils so manufactured from a palladium alloy are especially suitable for separating hydrogen from the product gas of a methanol reformation reaction.

A further aspect of the present invention uses a metal membrane foil consisting of a homogeneous alloy. To manufacture the foil, the metal membrane foil built up from the alternate layers of the metals involved is subjected to a tempering process selected so that intermetallic diffusion takes place between the individual layers, so that the layers of the different metals join to form a homogeneous alloy. This method is especially suitable for producing a metal membrane foil that is built up from a palladium alloy composed of two metals.

According to another aspect of the present invention, a membrane foil is used in which at least some of the layers are deposited by the continuous process. To work the continuous process, a suitable number of successive galvanic baths containing various metals involved and each having corresponding rotating deposition rollers is provided, and the metal foil is guided successively over the successive deposition rollers, dipping into the respective galvanic baths to lay down the respective layers.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
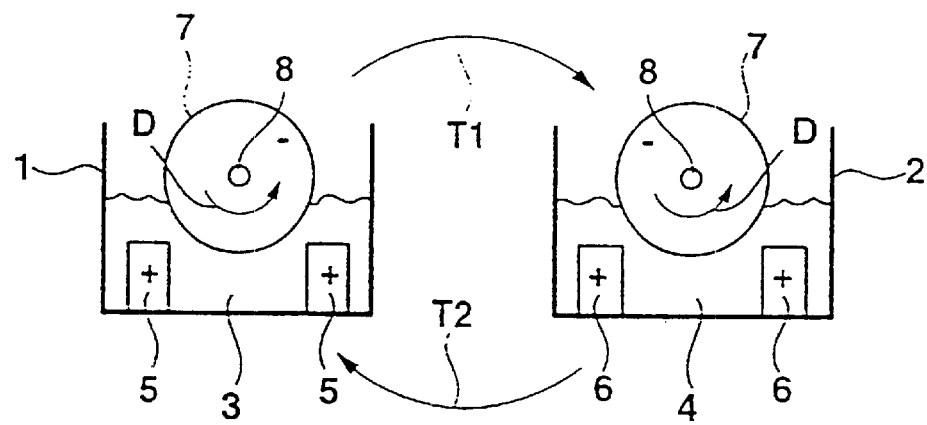
FIG. 1 is a schematic side view of two different galvanic baths for producing a metal membrane foil from two different metals by galvanic deposition.

FIG. 1 shows a first example of the manufacture of a metal membrane foil made of a palladium alloy composed of two metals, for example an alloy of palladium and a metal from Group VIII or IB, which is especially suitable for installation in a methanol reformation system in order to separate hydrogen from the product gas of the methanol reformation reaction. To produce such a foil, initially two galvanic baths 1, 2 of different types are prepared, with bath 1 containing an electrolyte solution containing a first metal to be deposited, such as palladium, for galvanic deposition of this first metal and second bath 2 containing an electrolyte solution 4 that contains this second metal for deposition of the other second metal, for example one from Group VIII or IB. Baths 1 and 2 contain anodes 5 and 6, respectively.

The foil is then built up by alternate galvanic deposition of a layer of the first and then the second metal on the circumference of a cylindrical stainless steel roller 7 used as the deposition roller. For this purpose, the stainless steel roller 7 is initially dipped into first bath 1, for example with approximately half of its circumference, as shown in FIG. 1, and is wired as a cathode, in other words it is electrically charged negatively relative to anode 5. As a result, a layer of the first metal, a palladium layer for example, is deposited on the circumference of the roller. During the separation process, the roller 7 is caused to rotate around its lengthwise axis 8 at a suitable rotational speed, as indicated by arrow D. After a first layer of the first metal with a typical thickness of several micrometers at the most has been deposited on the circumference of the stainless steel roller 7, the roller 7 is removed from first bath 1, containing palladium for example, and, as indicated by arrow T1 in FIG. 1, is dipped in an analogous fashion into second galvanic bath 2, where it is again charged negatively as a cathode and caused to rotate at a suitable rotational speed.

As a result, a first layer made of the second metal is deposited on the first layer of the first metal. When this layer has formed to the desired thickness, which is preferably of the same order of magnitude as the thickness of the layer of the first metal, the roller 7 is removed from the second bath 2, and, as indicated by arrow T2 in FIG. 1, is placed once again in first bath 1, in order to apply a second layer of the first metal on top of the first layer of the second metal. Preferably the second layer of the first metal is deposited with approximately the same thickness as the first layer in question. Then the roller 7 is again transferred from the first bath 1 to the second bath 2 in order to apply a second layer of the second metal on top of the second layer of the first metal, preferably once again with approximately the same thickness.

Figure 2:
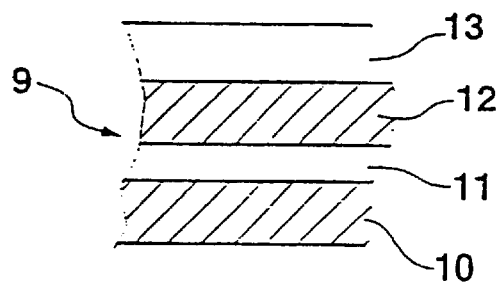
FIG. 2 is a portion of a cross section of a metal membrane foil obtained with the baths of FIG. 1.

The structure of a metal foil 9 thus obtained by the procedure according to FIG. 1 can be seen in FIG. 2. Foil 9 consists of a first palladium layer 10, a first layer 11 of a metal from Group VIII or IB, a second palladium layer 12, and a second layer 13 made of the metal from Group VIII or IB. Depending on the application, this layer structure can be expanded by additional alternate layers of palladium or the metal from Group VIII or IB, with the stainless steel roller 7 being placed repeatedly and alternately in first bath 1 and second bath 2, where the respective layers are deposited galvanically. As soon as the desired layer structure has been produced, the metal foil thus formed is removed from the circumference of the stainless steel roller 7. By controlling the thickness of the individual layers and by choosing a suitable number of layers, the foil thickness can be adjusted as desired. In particular, very thin metal foils with thicknesses significantly below 50 $\mu$m and preferably less than 20 $\mu$m can readily be manufactured by this method. In addition, foil widths of up to 2 m for example are possible without difficulty, with the stainless steel roller 7 being made of a suitable length.

For the special application of a metal membrane foil for hydrogen separation, for example from a process gas of a methanol reformation system for supplying hydrogen for a fuel cell system of a motor vehicle, a homogeneous alloy composition is desirable for the foil. This can be achieved by further processing of the metal foil shown as a stack of layers in FIG. 2. Metal foil 9 built up from the stack of layers is subjected to a conventional tempering process whose process parameters are chosen so that sufficient intermetallic diffusion takes place between the individual layers 10 to 13, so that a homogeneous alloy of the two metals involved is obtained from the stack of layers, e.g. in the specially mentioned example, palladium on the one hand and the metal from Group VIII or IV on the other. In addition to the tempering process parameters, the thicknesses of the individual layers 10 to 13 are chosen accordingly for producing the homogeneous alloy, in other words they are adjusted to the diffusion lengths of the metals involved in order to obtain an optimum mixing of the alloy partners in the tempering step.

The method example described is therefore especially suitable for manufacturing a metal membrane foil from a palladium alloy suitable for hydrogen separation with a highly uniform and limited thickness as well as considerable width when necessary, at comparatively low cost. The material costs, due to the required hydrogen separation ability, are very low because of the limited thickness, since the permeation rate increases as the foil thickness decreases and therefore less material is required, both in terms of thickness as well as area. Using the palladium alloy material instead of pure palladium has the advantage that the problem of foil embrittlement by hydrogen action is avoided to the greatest extent possible.

If the foil, as described above, is manufactured without a foil carrier material beneath, the galvanic deposition processes are repeated as often as required until the multilayer foil that is formed exhibits sufficient mechanical stability. As an alternative to the example shown, depending on the application, the foil can be applied to a flexible foil carrier that ensures mechanical stability.

Figure 3:
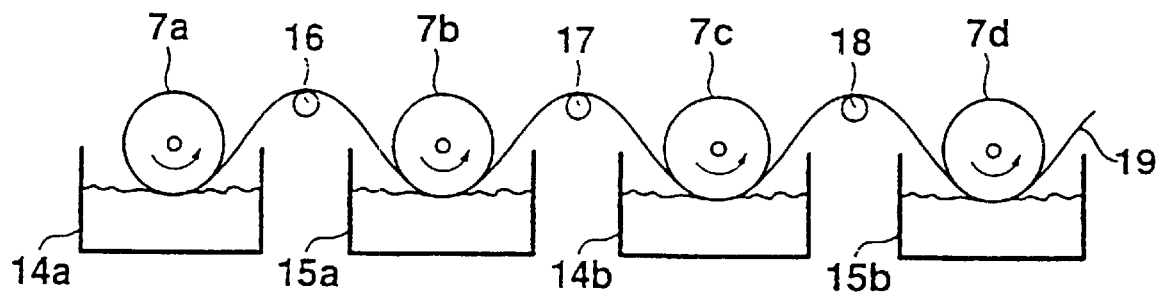
FIG. 3 is a schematic side view of a galvanic bath system suitable for a continuous process for manufacturing metal membrane foils composed of several metals.

FIG. 3 shows another embodiment in which a metal foil corresponding to FIG. 2 is manufactured as strip material in a continuous process. For this purpose, a number of serial galvanic baths 14*a*, 15*a*, 14*b*, 15*b* are prepared corresponding to the number of layers to be deposited, with a first group of alternate baths 14*a*, 14*b* of the same type as first galvanic bath 1 in FIG. 1 is filled with electrolyte solution 3 that contains the first metal, palladium for example, and a second group of alternate baths 15*a*, 15*b* of the same type as second galvanic bath 2 in FIG. 1 is filled with electrolyte solution 4 containing the second metal, for example one from Groups VIII to IB.

Each bath 14*a*, 15*a*, 14*b*, 15*b* has a separate stainless steel roller 7*a*, 7*b*, 7*c*, 7*d* associated with it, which is negatively charged as a cathode and dips with its bottom circumferential area into the electrolyte solution in question. Between baths 14*a*, 15*a*, 14*b*, and 15*b*, respective guide rollers 16, 17, and 18 are provided by which the foil layer structure formed up to that point is conducted from the circumference of the deposition roller of the previous bath to the circumference of the deposition roller of the next bath in order to deposit the next layer there galvanically. Guide rollers 16, 17, 18 and deposition rollers 7*a* to 7*d* rotate synchronously so that the metal foil to be manufactured is formed as a continuous foil strip 19. The length of metal foil 19 thus produced is consequently not limited to the circumferential length of a deposition roller. As indicated in FIG. 3, any desired number of galvanic baths can be provided for the continuous process to build up a foil layer stack with a corresponding number of layers. Foil strip 19 can then be cut into individual foil pieces of the desired length. If a homogenous composition of the foil is desired, multilayer foil 19 is then tempered in the manner described above, which optionally can be performed using while it is still strip material or with the individual foil pieces separated.

The above description of advantageous embodiments makes it clear that metal foils composed of several metals can be manufactured simply and economically by this method with limited thicknesses and practically unlimited width and length and, because of the lower mechanical stress on the foil material during the manufacture, of a better quality than by a rolling technique. Galvanic foil manufacture therefore produces a more stable grain structure of the foil. Of course, depending on the requirements, foils can also be made by this method that consist of more than two different metals, for which purpose.

A corresponding number of different galvanic baths is. provided, in other words containing different electrolyte solutions, with one layer of the corresponding metal for the foil being deposited alternately each time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of making a metal membrane foil comprising a palladium alloy for hydrogen separation from a process gas mixture, said method comprising:

preparing galvanic baths, with each bath containing an electrolyte solution suitable for the deposition of a metal;

rolling and dipping at least one deposition roller into one of said galvanic baths;

electrically wiring said at least one deposition roller as a cathode;

forming the metal membrane foil by successive alternate galvanic deposition of metallic layers on a circumference of said at least one deposition roller; and removing said metal membrane foil from the at least one deposition roller.

2. A method of making a metal membrane foil according to claim 1, further comprising:

subjecting the foil to a tempering process following a final galvanic deposition, and forming a homogeneous alloy by intermetallic diffusion of the metallic layers alternately deposited.

3. A method of making a metal membrane foil comprising a palladium alloy for hydrogen separation from a process gas mixture, said method comprising:

preparing galvanic baths, with each bath containing an electrolyte solution suitable for the deposition of a metal;

forming the metal membrane foil by successive alternate galvanic deposition of metallic layers on a circumference of at least one deposition roller arranged to rotate and dip into the galvanic baths and electrically wired as a cathode; and removing said metal membrane foil from the at least one deposition roller, wherein at least some of the metallic layers are continuously deposited by guiding the metal membrane foil as a strip material over successive deposition rollers in the galvanic baths.

4. A method of making a metal membrane comprising a palladium alloy for hydrogen separation from a process gas mixture, said method comprising:

preparing galvanic baths, with each bath containing an electrolyte solution suitable for the deposition of a metal;

forming the metal membrane foil by successive alternate galvanic deposition of metallic layers on a circumference of at least one deposition roller arranged to rotate and dip into the galvanic baths and electrically wired as a cathode; and removing said metal membrane foil from the at least one deposition roller, subjecting the foil to a tempering process following a final galvanic deposition, and forming a homogeneous alloy by intermetallic diffusion of the metallic layers alternately deposited, wherein at least some of the metallic layers are continuously deposited by guiding the metal membrane foil as a strip material over successive deposition rollers in the galvanic baths.

5. A method of making a metal membrane foil comprising a palladium alloy for hydrogen separation from a process gas mixture, said method comprising:

preparing a plurality of galvanic baths, each bath comprising a different electrolyte solution;

electrically wiring a roller as a cathode;

successively dipping and rotating said roller in said plurality of galvanic baths, depositing a metal layer from each bath on the roller by alternate galvanic deposition, thereby forming a metal membrane foil comprising a plurality of metal layers; and removing the metal membrane foil from the roller.

* * * * *